Feb. 4, 1941.   R. D. HENDERSON   2,230,567
STEERING CONNECTOR METHOD AND MEANS FOR TRAILERS
Filed April 29, 1938   5 Sheets-Sheet 1

INVENTOR.
ROBERT D. HENDERSON
BY Ray Belmont Whitman
ATTORNEY.

Patented Feb. 4, 1941

2,230,567

UNITED STATES PATENT OFFICE 2,230,567

STEERING CONNECTOR METHOD AND MEANS FOR TRAILERS

Robert D. Henderson, Bronx, N. Y.

Application April 29, 1938, Serial No. 204,936

5 Claims. (Cl. 280—33.5)

This invention relates to steering connector methods and means for trailers, and more especially to a connecting means between an automobile and a house trailer or other pulled vehicle having a wheel or wheels in a position other than to the rear of the center of said trailer when considered in a fore-and-aft direction. It also includes improvements in means for swivelly mounting a wheel or wheels under the trailer in a position for steering the same out of a straight path.

An object of the invention is to provide a method and means for steerably controlling a trailer hitched behind a tow car.

Another object is to provide a hitch adapted to permit a car and hitched trailer to be reversed in direction in a turning space slightly longer than the length of the trailer, assuming the common condition that said trailer is longer than the car.

Another object is to provide connecting means between a car and trailer in conjunction with steering means on the trailer so arranged that the car may be variously maneuvered with the trailer in exactly the same manner as without it.

A further object is to provide a flexible hitch between car and trailer adapted to operate a combined supporting and steering means on the trailer, so that the trailer will fall into any desired position behind the car without other than normal turning of the car to enable such positioning thereof, said flexibility of the hitch serving to absorb the shock during manoeuvring movements.

Another object of the invention is to provide a movable stop member for a trailer hitch so arranged that in conjunction with the hitch it permits a movement of the car relative to the trailer of a full 180 degrees to each side.

Yet another object is to provide a car and trailer with a hitch adapted to permit the car being towed alongside of and parallel to the trailer for an indefinite distance without the latter getting out of line with the former.

All these and other objects as suggested herebelow are attained by the methods and means now to be described, and illustrated in the accompanying drawings, in which.

Like numerals refer to like parts throughout the several views.

This invention is primarily a means for towing a trailer behind a car in such manner that the car may be substantially maneuvered just as though the trailer were not there and the trailer will take up proper positions at all times without any attention whatsoever from the driver and in the minimum possible width of space. By means of this invention there is obtained substantially perfect maneuverability in the trailer, enabling the driver to turn completely around in a narrow space such as a country road or a narrow city street by the same steering movements that are used in turning an automobile alone under the same conditions.

Also this method and means of connecting a car and trailer provides a flexibility of positions in backing them, as for instance, parallel adjacent or alignment backing, staggered parallel backing with the car on the right or left side of the trailer, and the indefinite backing of the car while the trailer always remains substantially parallel.

This invention also gives great flexibility in turning maneuvers, permitting, for instance, such maneuvers as turning around by the familiar forward-backward-forward turn of an automobile, turning the automobile forward into a right or left intersection and backing out in an opposite arc and then going forward in the opposite direction of that originally. Also there is possible the maneuver of turning and backing the automobile into a right or left intersection with the trailer moving around to a parallel position and then turning the car forwardly to assume a direction opposite to the original direction.

This invention also comprises the use of a pair of forward wheels on a trailer, preferably having the same width of tread as the tractor or pulling car, and with means permitting a full 360 degrees turning arc for the axle and wheels assembly of the trailer.

Finally, this invention facilitates parking the car and trailer in parallel positions in parking lots or camps where quick parking in the smallest space is an essential.

Figure 1:
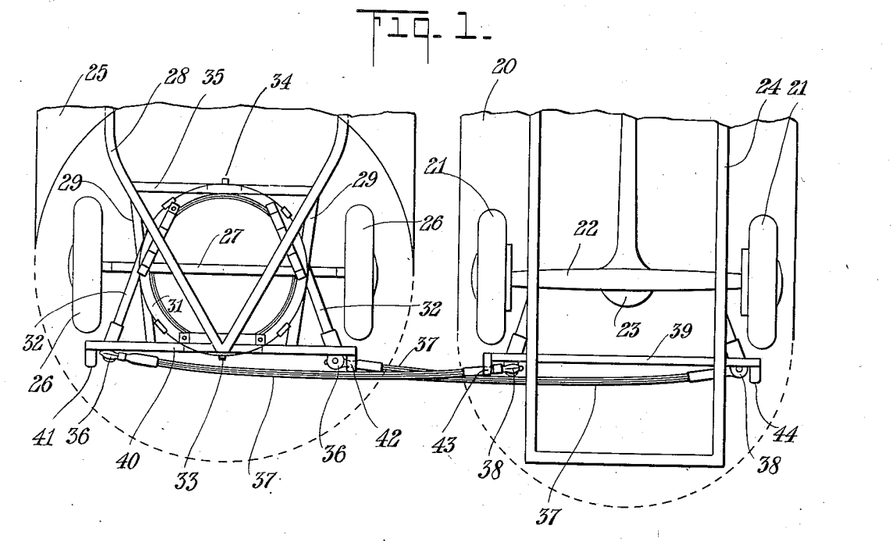
Figure 1 is a top plan fragmentary view of a towing car and a trailer in parallel relation, connected together by means of a preferred embodiment of the invention which is the subject of this application, and showing the front-end of the trailer during the operation of backing the car.
Figure 2:
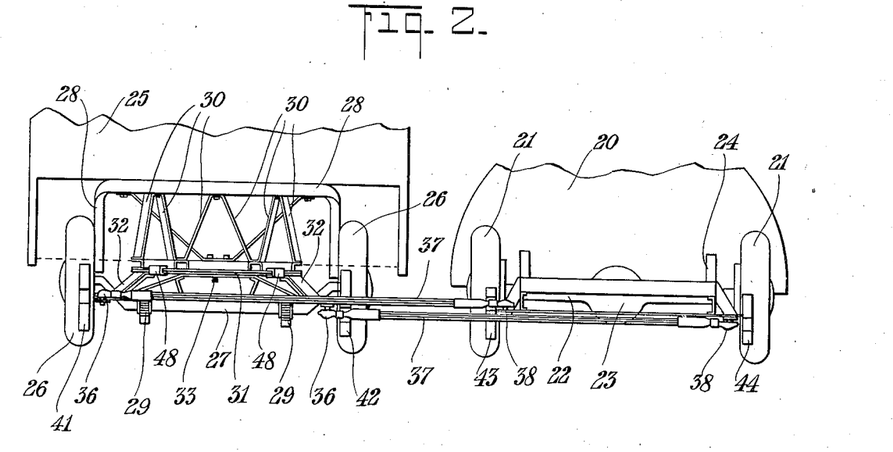
Fig. 2 is a side elevational view, taken from the rear of the car, and showing the steering connector means when in the position of Fig. 1.

In Figs. 1 and 2 there is shown a portion of an automobile or tow car having a body 20, rear wheels 21, 21, an axle 22, a differential housing 23, and chassis frame 24. There is also shown a portion of the front-end of a house trailer having a body 25, wheels 26, 26, axle 27, chassis frame 28, and springs 29, 29. Secured in a horizontal position to frame 28 by means of brackets 30, 30 is a ring assembly 31 to which the wheel and axle assembly is affixed by means of braces, this arrangement being such that these forward or steering wheels of the trailer are permitted to rotate by means of the ring assembly, as hereafter described more in detail. A stop member 33, Fig. 1, is attached to the revolvable ring, and there is another movable stop member 34 affixed to fixed rings 31a, Fig. 8, and so arranged as to engage with and stop the movement of member 33 and its attached ring, while yet permitting a full 180 degree movement of the latter from either side. The detail of construction of this stop is hereafter explained more fully.

Attached to the rearmost ends of draft members 32, 32 are ball hitch members 36, 36, as described more in detail hereafter, and attached to these ball hitches are companion portions affixed to the adjacent ends, respectively of two flexible connector rods 37, 37. The opposite ends of these rods are similarly connected to braces attached to the chassis of the automobile, as by hitch means at 38, 38. The cross brace on the car is numbered 39 and that on the trailer 40. At each end of braces 39, 40 are vertically positioned stop members 41, 42, 43 and 44 to limit the movement of the connectors 37, 37 and providing a stop for them when in the position shown substantially in Figs. 1 and 2 or in a similar position with car and trailer on opposite sides to that shown in said figures.

Figure 3:
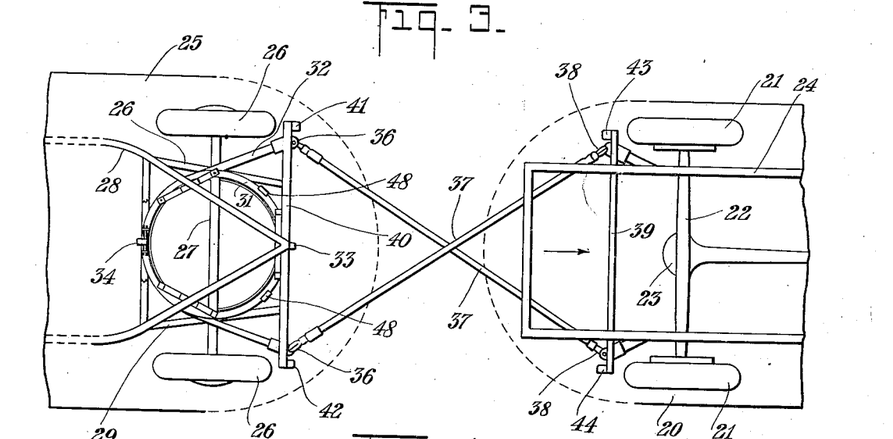
Fig. 3 is a top plan fragmentary view of car and trailer connected by this invention, showing the bodies only in outline to better show the chassis and connector mechanism.
Figure 4:
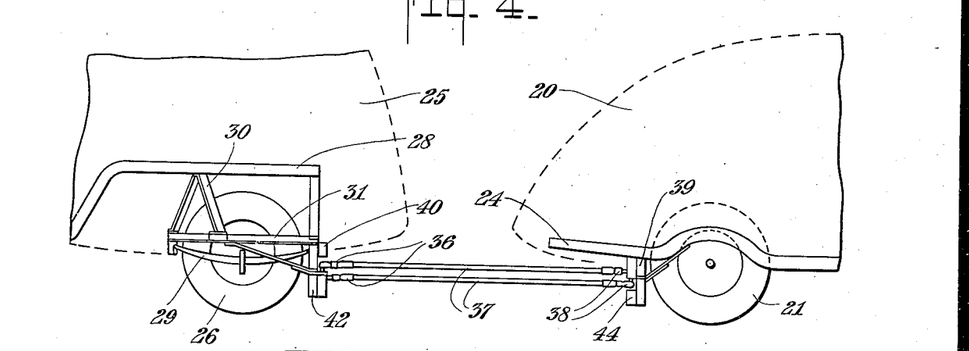
Fig. 4 is a side vertical elevation of the device of Fig. 3.

Figs. 3 and 4 show trailer and car connected by this hitch but in the normal towing relation with the car moving forwardly and the trailer following in the same line. These figures show a top view somewhat in phantom (Fig. 3) and a side vertical elevation (Fig. 4), and as to the latter the detail of the trailer shows the far wheel with the near wheel removed to bring out clearly the position of the spring and attendant parts. It will be noted that in this hitch there is a transverse member or brace 39 rigidly attached to the frame of the car and another transverse member 40 rigidly attached to the ring-and-wheel-assembly of the trailer, and that these members have equally spaced brackets with the hitch balls 38, 38 on the car and 36, 36 on the trailer mounted near the ends of said brackets. It will also be noted that two of the hitch balls project upwardly, one being on one side of the car and the other being on the other side of the trailer, and the remaining two hitch balls project downwardly, these also being diagonally opposite in their position on car and trailer. Thus the two rods 37, 37 are crossed when considered in plan view as in Fig. 3 but are parallel when considered in horizontal plane as shown in Fig. 4, and that while they are closely adjacent one of the connectors is slightly above the other and that this is accomplished by attaching one said connector to the two hitch balls which project upwardly and the other connector to the downwardly-projecting balls.

Figures 5, 6:
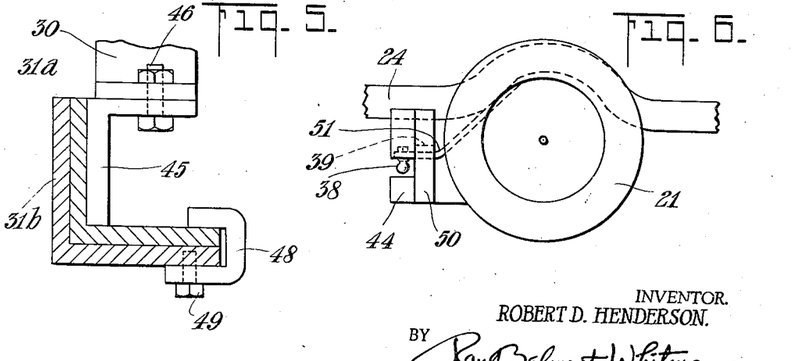
Fig. 5 is a cross sectional view of a detail showing the arrangement of the stationary and movable ring by which the front wheels of the trailer are rotatably mounted.
Fig. 6 is a fragmentary vertical side elevational detail of one of the rear wheels of the car showing the positioning of the ball connector to which one of the link connectors is flexibly attached, and also showing the rubber stop on the car for engagement with the connectors when in the position, for instance, of Fig. 1.

The detail of the construction of the ring mounting for permitting the wheel or wheels of the trailer to turn steerably, is shown in Fig. 5, in which the fixed ring 31a is shown as comprising an angle iron bent to circular shape and securely attached in a horizontal plane to the trailer chassis by means of a ring bracket 45 attached to the frame as by bolt 46 and clip or brace 39. Member 45 is welded to the outer face of fixed ring 31a along its contacting surface for greater strength. Immediately surrounding fixed ring 31a and in sliding contact therewith over substantially all of its inner and bottom surface is a rotating ring 31b, the contacting surfaces between the two rings acting as bearing surfaces and being carefully machined or otherwise smoothed with that in mind. Attached in spaced relation to the lower outer surface of rotating ring 31b at various points along its periphery are a number of retainer members 48 held to member 31b as by bolt 49 and extending upwardly and inwardly over the lower ends of the two rings and making sliding contact with the upper surface of the fixed ring for the purpose of holding the rotating ring in proper relation, as shown, to the fixed ring. It will of course be understood that the wheel and axle assembly is mounted beneath the rotating ring 31b and affixed thereto so that the wheels are made steerable and yet are safely prevented from becoming unseated beneath the trailer.

The enlarged detail shown in Fig. 6 has been inserted primarily to show how the downwardly-extending hitch ball 38 and the rubber stop member 44 is applied to either vehicle, but in this instance to the car shown to the right in Fig. 4. The wheel is designated as 21 and the main chassis frame of the car as 24. Member 50 is an angle iron welded or otherwise affixed to the member 39 and there is also a brace member 51 welded and bolted or both welded and bolted to member 24 somewhat after the manner shown in dash lines in the drawings. The hitch balls 38 are thus each securely attached to the vehicles in such manner as to safely carry whatever load may be applied to it. Beneath and above said ball is a rubber stop 44 suitably held in that position and adapted to bear against one of the connector rods 37 when same have been swung to the position shown in the first two figures, so that the load of towing the trailer backwards will be taken up resiliently by this stop member.

Now, it should be noted that when car and trailer are positioned in side parallel position, either adjacent or staggered, that there is a reasonable space left between the sides of car and trailer. This usually is about one foot. Thus it will be apparent that some arrangement must be made to prevent the turning of the trailer wheels to a point beyond 180 degrees on each side. This is accomplished by stationary stop 33, Fig. 1, and a corresponding stop member 33. Now since stop member 33 must have an appreciable width it will be apparent that a turning somewhat less than 180 degrees could only be possible if said stop were stationary. Since, however, it is quite important that a full 180 degree turn be made to either side, the stop 34 instead of being stationary is made somewhat movable in the manner shown in Figs. 7 and 8. Here the stop is numbered 34 and it is mounted on two horizontally-placed parallel rods 52, 53 secured to stop 34 by means of pins 54. Spaced on each side of movable stop 34 are holding brackets 55, 56 affixed to stationary ring 31a, as by welding. Positioned between said stop and brackets are spiral springs 57 surrounding the sliding rods 52, 53 and adapted to resiliently retain stop 34 in a central position with regard to said brackets and yet permitting it to move on its sliding rods which slide through openings in the brackets to either side a distance equal to its width, as clearly shown in the drawings. Thus, when the projecting stop 33, which is affixed to rotating ring 31b, moves around from one side or the other during the process of turning the wheels of the trailer in steering, until it bears against stop 34 it will be caused to push said movable stop to one side or the other a distance sufficient to at least compensate for the lateral width of said stop at the point of contact and so permitting a full turning of the wheels of 180 degrees to either side.

Figure 9:
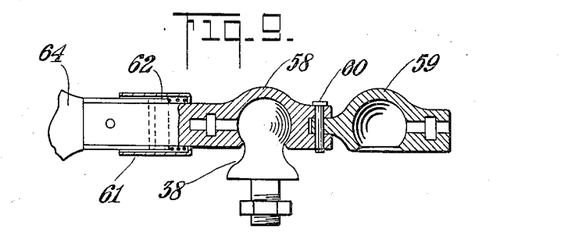
Fig. 9 is a vertical side sectional view, partly in elevation, of the removable ball connector means at each end of the connector rods, showing the ball member itself positioned in the ball cavity of the rod and the locking half of said cavity member swung to open position.
Figure 10:
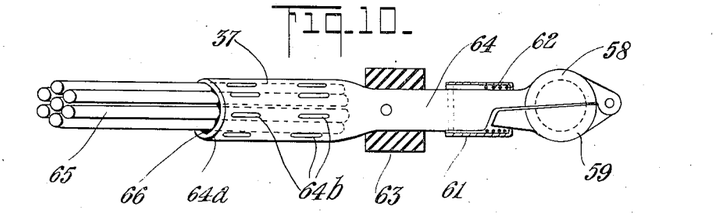
Fig. 10 is a longitudinal perspective view of an end portion of the flexible connector rod which is one of the essential members of this connecting means, and showing the ball connector removable hitch of Fig. 9 but in plan view instead of side view as in Fig. 9. This also shows the rubber collar sometimes used to cushion the engagement of the connector member with the stops on the vehicles.

Figure 9 shows a standard form of ball hitch which consists of the ball member 38 (or the same as 36 of Fig. 1) with its lower or shank portion and bolt for holding it in up or down position on car or trailer, and two split halves of a socket member, one numbered 58 being integral with the end of connector rod 37 and the other numbered 59 being hingedly attached thereto as by pin 60 so that when swung into place, after ball 38 is positioned in the cavity of member 58, and locked there, it will afford a strong universal joint connection between the rod and the vehicle. The locking may be accomplished by a sliding sleeve 61 normally held in locked position as shown in Fig. 10 by means of a spiral spring shown at 62 but which can be pressed to the left as shown in Fig. 9 when uncoupling or coupling the two members together. A hard rubber sleeve 63 may be positioned over the shank end of connector rod 37, as shown in Fig. 10, for the purpose of filling the stop recess to present a full rubber buffer for the overlapping tow rod. This prevents possible chafing of and damage to the connector rods.

It now remains to describe the specific construction of the flexible connector rods 37 which are shown in detail, fragmentary but sufficient, in Fig. 10. The shank portion 64 which terminates in the ball hitch cavity member on one end, as explained above, terminates at the other end in a sleeve portion 64a having a series of slots 64b through its wall. Seven spring steel rods 65 are nested together and their ends inserted into this cavity 64a and they are held therein by welding lugs in the slots 64b to fill up said slots, the lugs being of course weldably attached to the rods immediately beneath the slots, the whole being so arranged that each end of each rod except the center one is held to portion 64a by means of two such lugs or welds. These slots may be milled from the sleeve and filled up afterwards by means of further welding. Then each of the rods as shown in black at 66 where they emerge from the sleeve is also filled with welding metal.

These spring steel rods 65 are each preferably one-half inch in diameter and they take up slightly flexible positions, as shown for instance in Fig. 1, and cushion the shocks and strains of moving the trailer.

Thus it will be seen that by means of transverse members rigidly attached to the frame under the rear of the tractor or car and similar transverse members mounted forwardly of the front wheels on the trailer, and having equally spaced brackets with mounted balls, there being two upright diagonally opposite and two inverted and also mounted diagonally opposite, and these being connected by the towing rods composed of seven spring steel rods inserted at either end into sleeves which in turn are attached to ball joint hitches of a split hinged type of a well-known make, that this comprises a brief description of this important portion of the invention. It will also be noted that adjacent to the pivot of each rod a rubber faced stop having a recess on the same plane as said adjacent ball joint allows the tow rod to recede within this slot. The stop then presents a projecting surface to the rod pivoted at the opposite end of the transverse member or brace.

It will also be noted that these transverse braces are placed at equal distances from the pivotal point of their adjacent axles.

Figure 7:
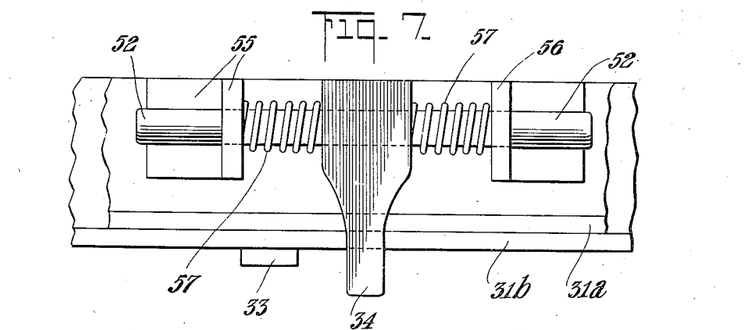
Fig. 7 is a detail view in vertical elevation of the movable stop member for limiting the position of the movable ring with reference to its stationary ring which together comprise the revolvable support for the front wheel or wheels of the trailer.
Figure 8:
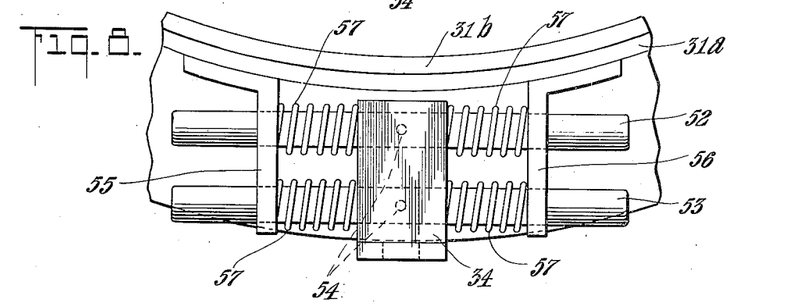
Fig. 8 is a top plan view of the detail of the stop shown in Fig. 7.

It will also be noticed that the movable spring stop shown in Figs. 7 and 8 allows the front wheel assembly of the trailer to turn under a rotative thrust 360 degrees more or less, or 180 degrees from a normal straight forward alignment of car and trailer.

It will be noticed further that the front wheels of the trailer and rear wheels of the car are approximately parallel in all backward movements of the car after the rods have come in contact with the stops. That is to say, when in a backward movement of the car the rods have reached a point where the stops function to limit their movement, the front wheels of the trailer and the rear wheels of the car are approximately parallel.

It will be noted, too, that the stop members at each end of the transverse members extend both above and below the latter. It will of course be understood that these stops can be arranged with deflecting extensions to prevent the rods passing under and behind the stops. It will be further noted that the stops are placed within the inside line of the tire and immediately behind the same in the case of the car and immediately in front of the tire in the case of the trailer to prevent their contacting with the road under irregular road conditions and to permit following in rutted roadways.

Figure 11:
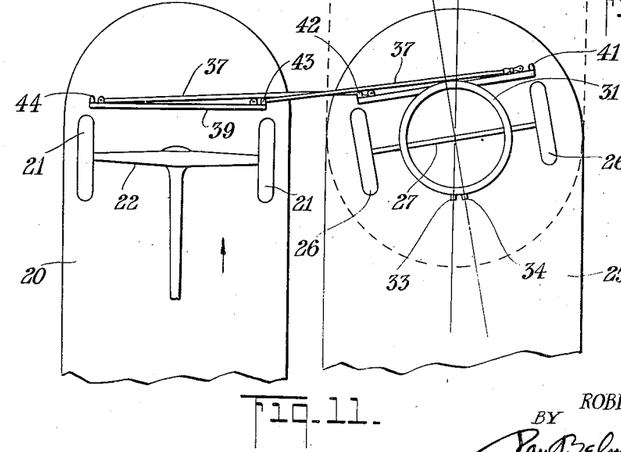
Fig. 11 is a top plan view, somewhat diagrammatic, showing in exaggerated position the toe-in position of the front wheels (or wheel, if there is but one) of the trailer in relation to the line of travel of the rear wheels of the car when the latter is being driven rearwardly and towing the trailer in parallel relation thereto.

The diagrammatic view shown in Fig. 11 illustrates why it is possible to tow the trailer from the car while in reverse in parallel aligned relationship for an indefinite distance without the trailer tending to get out of parallel line. This is so because in such position the parts are carefully arranged so that the wheels 26 of the trailer are caused to toe-in slightly toward the line of travel of the car. The figure is greatly exaggerated for purposes of illustration over the amount of toe-in necessary to accomplish this indefinite reverse towing of the trailer parallel to the car. That is to say, the trailer wheels tend to steer outward from the line of the car but are prevented from doing so by the stops contacting with the connector rods, in manner as clearly shown.

Figure 12:
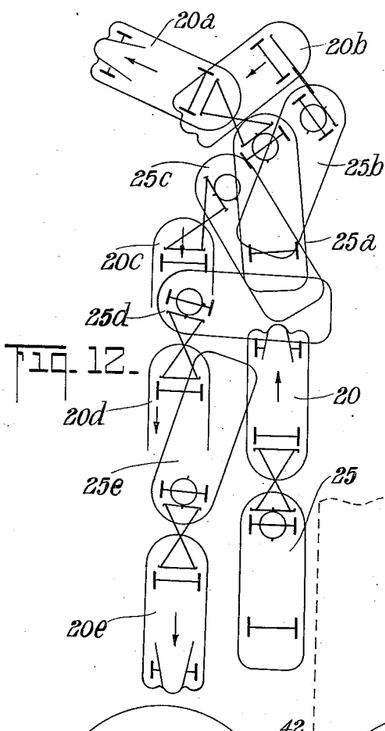
Fig. 12 is a diagrammatic view of car and trailer connected together by this invention and showing six successive positions of towing the trailer forwardly and then turning around to thereafter tow it in an opposite direction, and without requiring much space in excess of the length of the trailer during this essential maneuver.

The diagrammatic composite figure, Fig. 12, shows car 20 towing trailer 25 in direction toward the top of the sheet as indicated by the arrows on the car. The first position is at the lower right of this figure. The maneuver is to reverse the direction of normal towing. In the next position the car is shown at 20a and the trailer at 25a and the direction of the wheels of both car and trailer and also the position of the connector rods is shown in outline. It might be observed at this point that cross brace 40, Fig. 1, moves with the wheels 26 about the ring assembly 31, and this is indicated correctly in outline at 25a in Fig. 12. The third position of the car is shown at 20b and that of the trailer at 25b. The fourth position is shown at 20c and 25c respectively. The fifth position is shown at 20d and 25d respectively. Finally, the last position is shown at 20e and 25e respectively and the car is again towing the trailer behind it in the reverse position and after going a slight distance further than that shown the trailer will be directly behind the car, as it was in the initial position.

Figure 13:
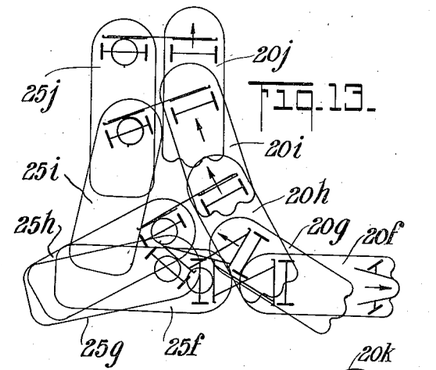
Fig. 13 shows diagrammatically five successive positions of car and trailer connected by this invention to depict the maneuver of parking car and trailer from a road to a trailer parking space at right angles thereto and thus to bring the car and trailer into final parking position in adjacent parallel relation with each other so as to require the minimum width of a parking lot.

In Fig. 13, the car 20f was moving to the right or in the direction of the arrow and pulling trailer 25f behind it in the normal way. It was then desired to back up car and trailer in a parking lot at right angles to the road and utilizing the minimum width of ground. So the driver turned the front wheels of his car as shown at 20f and started into reverse arriving at the position 20g at which point the trailer was in position 25g. Continuing, the next position was 20h and 25h respectively, then followed position 20i and 25i respectively, and the final position is shown at 20j and 25j respectively, at which point the two vehicles are in parallel adjacent position and so parked on a narrow lot. The correct position of all wheels and connectors are shown in outline.

Figure 14:
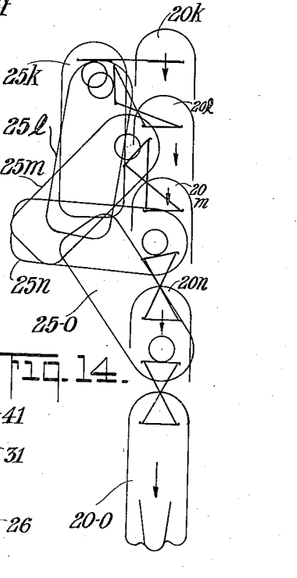
Fig. 14 shows diagrammatically in five views the successive positions of car and trailer when driving the former forwardly out of the parking lot in which it has been previously parked in the position shown in Fig. 13.

On leaving the parking lot the driver merely gets into his car and drives forwardly out of the lot just as though he were towing no trailer. Thus his position is shown at 20k, Fig. 14, and that of the trailer at 25k, this being identical to the 20j—25j position of Fig. 13. The next position of car and trailer is shown at 20l—25l, then follows 20m—25m, then 20n—25n, and finally at 20o, 25o the car is towing the trailer almost directly behind it and may from that position turn up or down the road or go straight ahead as circumstances dictate and complete the maneuver without any attention whatsoever to the position of the trailer.

Figure 15:
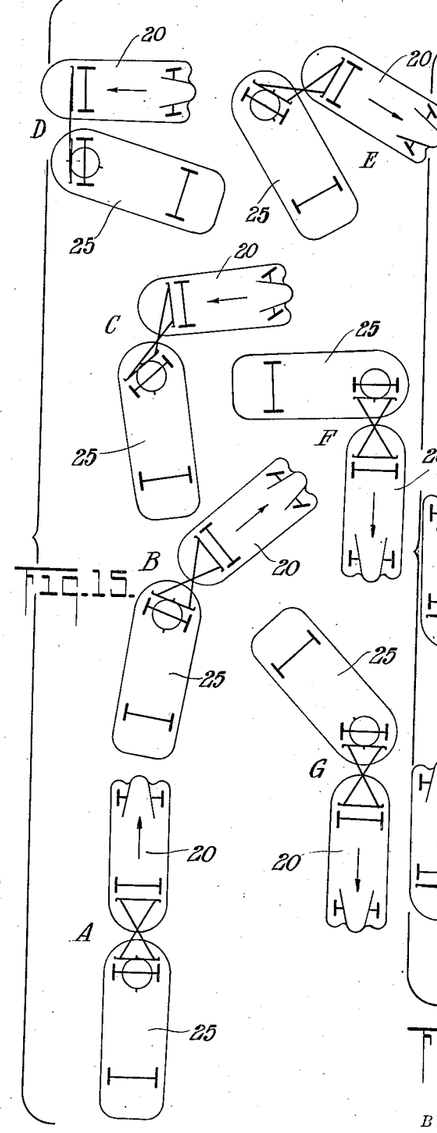
Fig. 15 shows diagrammatically seven separate successive positions of this same car and trailer, lettered A to G inclusive, by which the vehicles may be maneuvered in comparatively narrow space so as to reverse their driving direction.
Figures 16, 17:
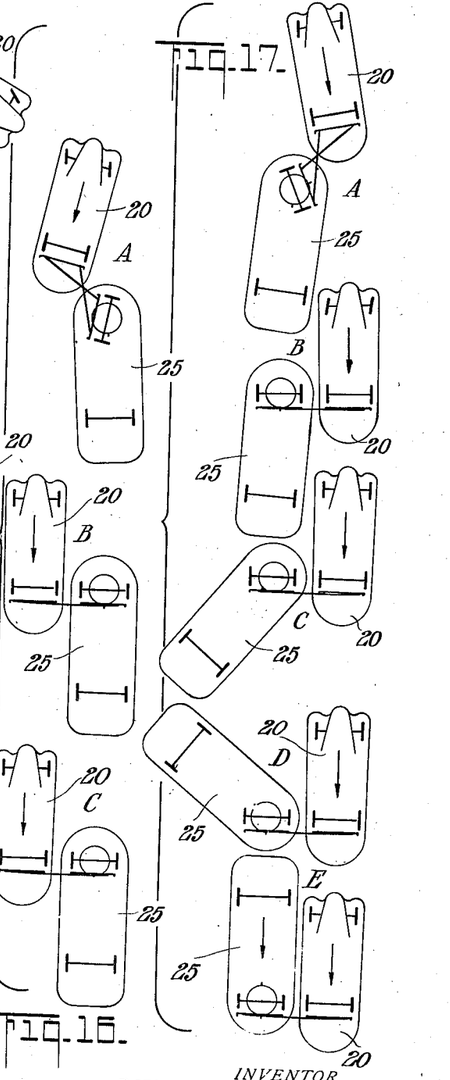
Fig. 16 shows diagrammatically three successive positions of car and trailer, lettered A to C inclusive, showing how the car may be backed up to bring it and the trailer into staggered parallel position, and thereafter to be driven rearwardly in said staggered parallel position.
Fig. 17 shows diagrammatically the car and trailer in five successive positions, lettered A to E inclusive, by which the car is reversed and the trailer is towed in adjacent parallel position on the opposite or left-hand side of the car from that shown in the previous figure for staggered parallel relation.

Figs. 15, 16, and 17 on the next sheet of drawings show other maneuvers, and for still greater clarity the individual positions of car and trailer are shown separately and without being interposed upon one another.

Thus, Fig. 15, starting at the bottom left shows car 20 towing trailer 25 upwardly or in the direction of the arrow, this being indicated as position A. The driver then cuts his wheels and moves ahead to the right to position B. He then reverses and cuts his wheels again as shown at C to come into that position. He then cuts his wheels to the position D to arrive at that position, being still in reverse. He then moves forward and car and trailer take up the position shown at E. He then continues ahead to arrive at position F and by further movement ahead he finally arrives at position G and soon finds his trailer being towed in a parallel position immediately behind him, as by further movement down the road.

In Fig. 16 the maneuver is to bring car and trailer into parallel staggered relation. To do this he cuts his wheels as shown in position A at the top of this figure and the trailer 25 takes up the position shown with its wheels and connectors positioned as shown in outline. To get into this position he has reversed, and he continues this movement until arriving at position B which is the position desired, at which point he straightens out his wheels as shown and continues indefinitely in reverse parallel staggered position thereafter, as shown at C.

It will be noted that in the previous figure, namely Fig. 16, the trailer was brought to the right side of the car. Now, in Fig. 17 it is desired to bring the trailer to the left side of the car and after arriving at parallel staggered position to continue to parallel adjacent position. So here again the driver goes into reverse and cuts his wheels as shown at position A and the trailer falls into the position there shown without any attention on his part. Next, he arrives at position B which is almost in staggered parallel relation, but not quite in that relation because he has continued to let his front wheels stay cut as originally. Now having started the rear-end of the trailer away from the line of direction of the car he straightens out his wheels and a further reverse movement brings car and trailer to position C. Continuing without any further change he then arrives at position D and finally at position E at which point car 20 and trailer 25 is in parallel aligned position, or side by side, with the car going backward and the trailer forward and this position may then be maintained indefinitely with the car in reverse and no further steering action by the driver.

It will be noted in Fig. 2 that the lowermost portion of the lower connector rod 37 is positioned so that it does not fall below the lowermost portion of differential housing 23 of the car and hence is not normally subject to any interference from the road's surface.

It will of course be understood that a suitable guard rail may be provided on car or trailer to prevent any unusual contact with either by any of the hitch members comprising this invention; however, the stop members previously described have been found in actual practical tests to be all that is normally required.

An inherent advantage to this construction is that when towing the trailer normally forward by means of the car the front wheels of the trailer track exactly in the tracks of the rear wheels of the car instead of along a smaller arc inside of the car track. This is of great practical importance because it prevents the trailer hitting an obstruction when rounding a turn which normally occurs in other types of hitches unless the driver remembers to swing sufficiently wide around the turn to give the trailer the needed substantial added clearance.

It should be noted that the length of the transverse member attached to the car is best limited by the greatest width of the car, since, for practical reasons, it is not desirable to have any portion of said member extend laterally beyond the sides of the car body. It should also be noted that the longer this transverse member is while still being limited in the above way, the better. Furthermore, it will be apparent that once this length of transverse member on the car is determined the length of the same member on the trailer is also determined, since the two must be identical in length. In this connection, of course, we are referring to the distance between the ball supports of the connector links, which are normally placed at or near the ends of said transverse members.

Now, having these facts determined, it becomes easy to determine the minimum practical length necessary for the two connector links, on any combination of car and trailer, regardless of the width of each and also regardless of the overhang of the car at its rear or that of the trailer at its forward portion. The rule is that each of these two links, which are of course each of the same length, must be of a length not less than the distance from the longitudinal axis of the car to the longitudinal axis of the trailer when the two vehicles are positioned side by side and in parallel relationship and spaced apart a distance from one another sufficient to prevent any portion of the bodies of either vehicle from making contact with the other vehicle during any kind of possible maneuver when the two vehicles are connected by links of that length in manner as here shown. This general rule works regardless of the positioning of either transverse member relative to the overhang of its vehicle and regardless of the widths of the vehicles.

It should also be noted that the transverse members and the stops must be so positioned on each vehicle that at any position of maneuvering, none of the connector rods will engage any other element except the stops designed to be engaged and will not moreover bind upon one another.

It will of course be understood that the flexibility of the connector links is responsible for the amount of toe-in of the front wheels of the trailer relative to the line of travel of the car. It will also be apparent that this amount of toe-in is dependent upon two factors, namely, the degree of flexibility of the rods themselves and the relative weight of the trailer being towed by said rods, as in the position shown in the first two figures of the drawings, namely adjacent parallel or staggered parallel position.

Now, of course, excessive toe-in of the front wheels of the trailer is no more to be desired than is insufficient toe-in; and since trailers vary in weight or frictional pull required by the tow car to move them at various speeds, and since it is not always practical to have a different flexibility of rods for each weight of trailer, then it becomes necessary to devise a means of maintaining the car tow-in under all trailer weights and with preferably but one degree of flexibility to the connector rods. This is accomplished in very simple manner by merely varying the rearward projection or fore-and-aft width of the stop members which engage the flexible rods to support the load on both vehicles. By this means the towing of a greater load brings about greater flexibility or bending of each rod, which is made to take up its position along a deeper arc by the more extending stop which projects rearwardly to engage the new position of the more bent rod at that point. Thus in fitting a set of standardized connector links to any combination of car and trailer, regardless of the weight of the trailer, the car toe-in of the trailer's front wheels may be easily arrived at by substituting the correct width of stops on each vehicle.

It seems necessary to explain at this point the necessity for the two co-acting stops on the ring assembly of the trailer steering wheel or wheels. This is primarily to prevent a condition during certain improper maneuvering of the vehicle which would otherwise result in the rear-end of the car striking the side of the trailer. For instance, in attempting to back around to the right, if the car were steered so that its rear-end is to the left of the trailer body the front wheel assembly of the trailer would be held in longitudinal direction between ring stops and a continued reverse movement of the car would be prevented, with its attendant injury to the trailer body, through the action of having to skid the front wheels of the trailer sideways. In this maneuver, therefore, the driver would realize that he could not make the maneuver in this position and he would therefore pull ahead and cut his wheels and then reverse so that the rear-end of the car comes around the front of the trailer to its right side and in such position the steering wheels of the trailer would be free to take up a position substantially parallel with the car wheels and hence the maneuver would be easily and properly accomplished.

It is of utmost importance that the transverse member of the car be positioned a distance from the axle of the rear wheels of the car exactly equal to the distance between the transverse member of the trailer and the axis of its front wheel assembly. This is important because if this equality of distance is not strictly adhered to there is a tendency for generating sway or side movement of the trailer when traveling at speed down a road. For a slight steering movement of the front wheels of the car is reflected to the transverse member an amount depending upon the lever arm from the point of support of the rear-end of the car to the transverse member—or, in other words, the distance between the rear axle and said transverse member; and this tendency of movement must be exactly the same on the front wheel assembly of the trailer in order that no sway may develop. Thus the distance between the transverse member and the front axle of the trailer must correspond to the other similar distance on the rear of the car as above-mentioned.

Of course, for an ideal condition this distance between transverse member and adjacent axle on each vehicle is best made zero; that is to say, the positioning of the ball connectors directly over each axle would permit car and trailer to attain very high speeds with entire elimination of any swaying effect whatsoever. However, this would call for radical rearrangement in the bodies of the vehicles and besides it has been found that for the highest practical driving speeds of today the distances may be maintained at a minimum either by positioning the transverse members under the end overhang of the vehicles or immediately at their extreme portions, being careful of course as explained above to keep the distances the same. Practically speaking, then, the ideal position of these transverse members under present-day conditions is as close as possible to the periphery of its adjacent tires.

Another interesting thing about this construction is the peculiarly important part played by the stops for the connector links. Thus, in either parallel aligned position or parallel staggered position of car and trailer, regardless of which side the one is to the other, the stops function to start the initial movement of the steering wheels of the trailer to bring them into proper position for maneuverability. The stop, which at the moment engages an intermediate portion of one link to bear the load of movement of the trailer wheels, actually operates to start said turning movement of the wheels in the proper steering direction and at the same time the particular connector link affected is transformed from a strut member to a tension member to aid in thereafter pulling the wheel assembly around as the movement of the car is continued to its proper steering position.

Another important point to be noted in connection with the connector rod stops is that the stops are placed outside of the adjacent point of connection of the rods in each case, and thus the opening in the stop for permitting the rod to enter in certain positions is made useful, which would not be the case if the stops were positioned inside of the rod connecting points. Moreover, there is less interference of other parts by this arrangement of stop and ball connector.

Having now described the invention, what is claimed as new and for which Letters Patent of the United States is desired, is:

1. The combination with a tow car and a trailer, of a steerable double front wheel assembly on the trailer, and a connector hitch between the wheel assembly and the car, said hitch including horizontally-parallel vertically-spaced cross-connecting links affixed to the assembly and the car by flexible joints at equi-spaced distances, said links being of equal length and each consisting of a plurality of nested spring steel rods whereby the links cushion the shocks and strains of moving the trailer.

2. In combination, a car, a trailer having a steerable front wheel, and flexible cross-connecting links connecting car and trailer wheel, including limiting-movement stop means adjacent the link-connecting points on car and trailer but laterally placed outside of said points, said stop means being adapted to engage an intermediate portion of one of said links when same extend laterally across the vehicles, and being recessed to prevent contact between it and the other cross connecting link.

3. The combination with a tow car and a trailer, of a steerable double front wheel assembly on the trailer, and a connector hitch between the wheel assembly and the car, said hitch including horizontally-parallel vertically-spaced cross-connecting links affixed to the assembly and the car by flexible joints at equi-spaced distances and including limiting movement stops on car and trailer, said stops having recesses and being arranged to project outside the line of the link-connecting points sufficient to engage and bend the overlapping link outwardly from the other link falling within the recess of said stop, in such manner that the rods will not engage one another and the stops will compensate for the bending of the rods.

4. The combination with a tow car and a trailer, of a steerable double front wheel assembly on the trailer, and a connector hitch between the wheel assembly and the car, said hitch including horizontally-parallel vertically-spaced cross-connecting links affixed to the assembly and the car by flexible joints at equi-spaced distances, including spaced stop members near the points of support of the cross-connecting links, each of said members extending both above and below the points of attachment of said links to effect stopping when the vehicles are supported in different horizontal planes.

5. Means for connecting a tow car rear and trailer front in side parallel relation, including a steerable front wheel assembly on the trailer, and bendable connecting links between said front and rear portions, and stop means on both vehicles adapted to engage intermediate portions of the links to form a lateral coupling and in such manner that during the operation of movement the steerable trailer wheel assembly is caused to toe-in slightly toward the path of the car.

ROBERT D. HENDERSON.